US007630179B2

(12) United States Patent
Umans

(10) Patent No.: US 7,630,179 B2
(45) Date of Patent: Dec. 8, 2009

(54) PROTECTIVE LINK FOR SUPERCONDUCTING COIL

(75) Inventor: Stephen D. Umans, Belmont, MA (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 484 days.

(21) Appl. No.: 11/232,523

(22) Filed: Sep. 22, 2005

(65) Prior Publication Data

US 2007/0063799 A1 Mar. 22, 2007

(51) Int. Cl.
*H02H 7/00* (2006.01)
*H02H 9/00* (2006.01)

(52) U.S. Cl. .......................................... 361/19; 361/58

(58) Field of Classification Search .................... 361/19
See application file for complete search history.

(56) References Cited

U.S. PATENT DOCUMENTS

| | | | | |
|---|---|---|---|---|
| 3,684,923 A | | 8/1972 | Keeler, II | |
| 5,210,674 A | | 5/1993 | Yamaguchi et al. | |
| 5,303,111 A | * | 4/1994 | Yamaguchi | 361/19 |
| 5,600,522 A | * | 2/1997 | Hull | 361/19 |
| 7,053,509 B2 | * | 5/2006 | Ryan et al. | 310/68 C |

OTHER PUBLICATIONS

Bohrer, P. et al., "The Case for Power Management In Web Servers", IBM Research, Austin, TX, http://www.research.ibm/com/arl, downloaded Jan. 9, 2006.
Chase, J.S. et al., "Managing Energy and Server Resources in Hosting Centers", downloaded Oct. 18, 2005.
Helmbold, D.P. et al., "A Dynamic Disk Spin-Down Technique for Mobile Computing", downloade Oct. 18, 2005.
Lebeck, A.R. et al., "Power Aware Page Allocation", (ASPLOS-IX), Nov. 2000.
Pinheiro, E. et al., "Load Balancing and Unbalancing for Power and Performance in Cluster-Based Systems", downloaded Oct. 18, 2005.
Advanced Configuration & Power Interface, http://www.acpi.info/, downloaded Oct. 18, 2005.

* cited by examiner

*Primary Examiner*—Albert W Paladini
*Assistant Examiner*—Dharti Patel
(74) *Attorney, Agent, or Firm*—Thompson Coburn LLP; Matthew J. Himich

(57) ABSTRACT

A superconducting coil system includes a superconducting coil and a protective link of superconducting material coupled to the superconducting coil. A rotating machine includes first and second coils and a protective link of superconducting material. The second coil is operable to rotate with respect to the first coil. One of the first and second coils is a superconducting coil. The protective link is coupled to the superconducting coil.

29 Claims, 3 Drawing Sheets

PROTECTIVE LINK FOR SUPERCONDUCTING COIL

STATEMENT REGARDING FEDERALLY SPONSORED RESEARCH OR DEVELOPMENT

This invention was made with Government support under Contract No. DE-FC36-93CH10580 awarded by the Department of Energy. The Government has certain rights to this invention.

Not applicable

CROSS-REFERENCE TO RELATED APPLICATIONS

Not applicable.

BACKGROUND OF THE INVENTION

The present invention relates generally to the field of superconducting coils and, more particularly, to a protective link for protecting a superconducting coil.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Superconductivity is the property of certain materials at cryogenic temperatures approaching absolute zero to carry electric currents without significant power dissipation. Low-temperature superconductors, which operate at temperatures below 10 K, are "ideal" in the sense that they have zero dc resistivity and hence produce zero power dissipation when operated within characteristic current and magnetic-field limits. High-temperature superconductors (HTS), which exhibit superconducting characteristics at liquid Nitrogen temperatures (77 K) and above are not ideal but rather are characterized by extremely low voltage drop, (again when operated within characteristic current and magnetic-field limits) and thus produce extremely low power dissipation as compared to conventional conductors under the same operating conditions. Because these high-temperature superconducting materials may be used more readily, the range of applications for their use has increased dramatically. High-temperature superconductors have applications in medical imaging systems, motors, generators, high-field magnets, etc.

The voltage-drop in HTS wire, and correspondingly across an HTS coil, is a highly non-linear function of the coil current as well as the coil temperature and magnetic field. As the coil current is increased the power dissipation will increase and at some point will exceed the capacity of the cooling system to achieve an equilibrium condition in the coil. Under such a condition, the temperature of the coil, as well as the coil voltage drop and power dissipation, will be observed to increase without apparent limit and, if this condition is maintained, will rise to the point that the coil may be damaged or destroyed. When this condition occurs, the coil is said to be undergoing a quench and it is typically desirable to take preventative action before damage occurs.

Quench can be initiated by a variety of circumstances. As described above, it can be initiated simply by operating an HTS coil at currents in excess of a maximum operating limit corresponding to normal coil operating conditions. Alternatively, an HTS coil may quench if the cooling system fails when the coil is operating at what would otherwise be an acceptable current level. In this case, the cooling system failure will result in a higher-than-expected coil temperature, voltage drop, and power dissipation.

Independent of the initiation event, it is necessary to detect the onset of a quench and to take preventative action. Various schemes based upon coil voltage, coil current, and other winding parameters have been devised to detect the onset of a quench event. Based upon the output of these detectors, HTS-coil current supplies are designed to shut down and to de-energize the coil so as to avoid coil damage.

Protection of an HTS coil is analogous to the protection of many electrical systems. For example, electric motors are frequently protected by thermally-operated mechanical disconnects. However, in most cases, there is a back-up system, consisting of a fuse or circuit breaker, selected to operate in case the primary protection system does not operate.

BRIEF SUMMARY OF THE INVENTION

The present inventors have recognized that a protective link of superconducting material may be used to protect a superconducting coil. The protective link is configured to have a higher quench sensitivity than the superconducting coil, thereby quenching, opening and interrupting the coil current, before the quench causes damage to the superconducting coil. In addition, the same protective link can be used as a sensor. The voltage developing across it during a quench may be used as a detection signal which can be used to initiate a protection algorithm to shut down the current superconducting coil.

One aspect of the present invention is seen in a superconducting coil system includes a superconducting coil and a protective link of superconducting material coupled to the superconducting coil.

Another aspect of the present invention is seen in a motor system including a stator, a superconducting coil on the motor rotor, a signal source, and a protective link of superconducting material. The superconducting rotor is operable to rotate within the stator. The signal source is operable to provide a first signal to the superconducting rotor. The protective link is connected in series between the signal source and the superconducting rotor.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
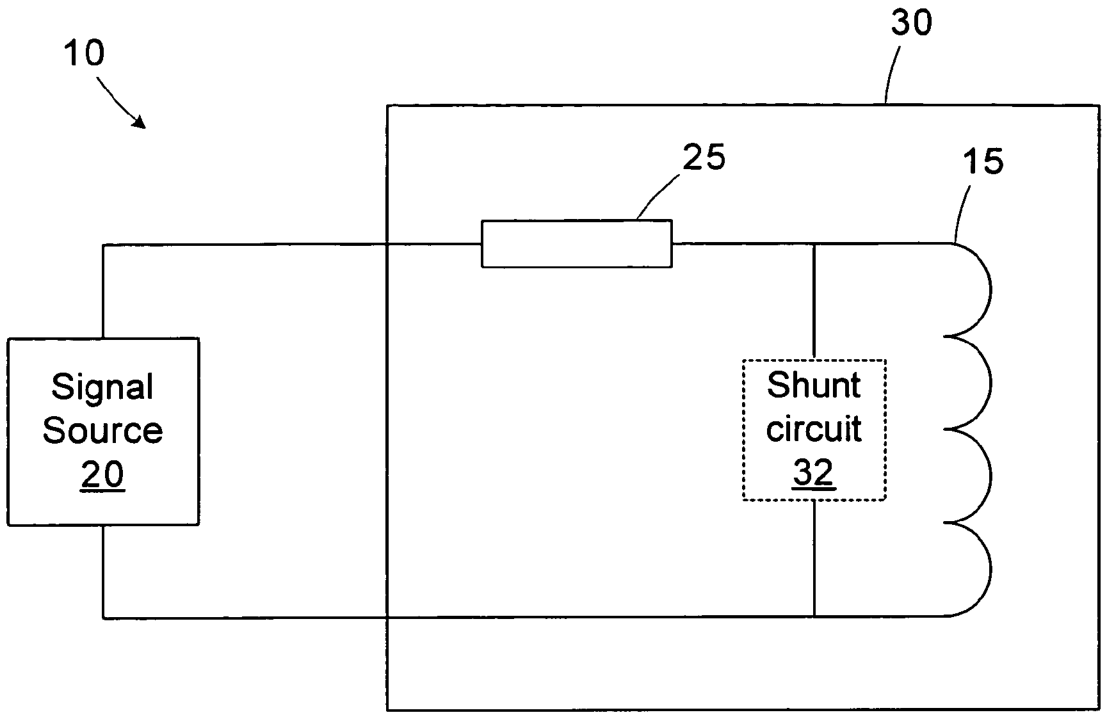
FIG. 1 is a simplified block diagram of a superconducting coil system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of a superconducting coil system 10. In general, the system 10 includes a superconducting coil 15, a signal source 20, a protective link 25 coupled in series between the superconducting coil 15 and the signal source 20, and a cooling enclosure 30 surrounding the superconducting coil 15 and the protective link 25. The superconducting coil 15 may be found in various applications, such as, but not limited to a magnet, a motor, a generator, a transformer, etc. Generally, the protective link 25 may be employed with any superconducting coil system regardless of it application. The superconducting coil 15 may carry AC or DC current. In the case where the superconducting coil 15 is intended to carry a DC current, the signal source 20 may be an excitation source. In some applications (e.g., a superconducting transformer) the signal source 20 may not be present, but rather the superconducting coil 15 may simply be connected to an electrical system.

Although the present invention is applicable both to low and high temperature superconducting coil systems, the following discussion is based on systems employing high-temperature superconductors. Under normal operating conditions, as determined by the coil cooling enclosure 30 temperature and coil current as well as externally-applied magnetic fields, with the coil 15 carrying a constant DC current, there will be a stable, steady-state voltage drop and corresponding power dissipation in the HTS coil 15. The coil temperature distribution will also be stable and will correspond to an equilibrium condition in which the heat removed from the coil 15 by the cooling system is equal to the power dissipation in the coil 15. Again the application of the invention is not limited to a particular application, such as a DC signal source 20.

The superconducting coil 15 and protective link 25 are both constructed of superconducting material and placed in the same general cooling environment within the cooling enclosure 30. The actual physical construct of the superconducting coil 15 and cooling system including the cooling enclosure 30 may vary, depending on the particular application of the superconducting coil 15. For example, if the superconducting coil 15 is employed in the rotor of a superconducting motor or generator, the cooling enclosure 30 may rotate with the superconducting rotor. The cooling medium may be introduced into the cooling enclosure 30 through the shaft of the motor/generator. Where the superconducting coil 15 is employed as a stationary magnet, the cooling enclosure 30 may also be stationary. The application of the present invention is not limited to any particular application of the superconducting coil 15 or construct of the cooling system or cooling enclosure 30.

Because the protective link 25 is coupled effectively in series with the superconducting coil 15, it carries the same current. The protective link 25 is constructed or positioned such that it has a higher quench sensitivity than the superconducting coil 15. Because the protective link 25 is more sensitive to disturbances than the superconducting coil 15, it will enter a quench state prior to the superconducting coil 15 under the same conditions. The tendency of the protective link 25 to quench prior to the superconducting coil 15 may be employed for various protective purposes.

In one embodiment, the protective link 25 acts as a protective fuse. As is the case for a conventional fuse, the primary function of the protective link 25 in this mode is to operate (e.g. open circuit) in the event the primary protection system for the coil does not operate. Unlike a conventional fuse, however, the fuse for a superconducting coil cannot be simply current controlled. Rather than being sensitive simply to a current level, a fuse for a superconducting coil must be sensitive to the onset of a quench, while still being simple and essentially passive. Dependence upon external sensors, active circuitry, etc. adds complexity, reduces reliability, and systems of such complexity tend to fall into the category of detection/protection systems and are not generally considered to be fuses.

Superconducting wire itself has quench-sensitive properties that make it ideally suited to serve as a fuse element for the superconducting coil 15. For example, the protective link 25 may consist of a "fusing" segment of HTS superconducting wire placed in series with the HTS coil 15 wound from the same HTS wire but mounted and cooled in such a fashion that its operating temperature is slightly higher than that of the coil. This would tend to make the small fusing segment of the protective link 25 more sensitive to quench. If a quench event is initiated and the coil 15 is not otherwise de-energized, the protective link 25 would fully quench and burn out or open (i.e., develop into an open circuit and interrupt the coil current before the quench in the HTS coil 15 proceeds to the point of coil damage).

As seen in FIG. 1, to avoid coil over-voltage, an optional shunt circuit 32 (e.g., a resistor or non-linear element) may be connected in parallel with the protective link 25 or the superconducting coil 15 to serve as an alternative, voltage-limiting current path to limit the inductively-produced voltage applied to the superconducting coil 15 should the protective link 25 open. During normal operation, little, if any, current passes through the shunt circuit 32 because the parallel superconducting path through the protective link has negligible resistance. Hence, the protective link 25 is effectively in series with the superconducting coil 15 during operation, even with the shunt circuit 32 in place.

Since the protective link 25 is placed in the cryogenic space along with the superconducting coil 15, when it opens, the coil system may be rendered inoperative and it may not be possible to readily replace the protective link 25 without considerable effort. However, significantly less effort and cost will be associated with replacing the protective link 25 than would be required to replace the superconducting coil 15 itself.

Note that in practice, the protective link 25 is sensitive to coil operating current and magnetic field and may be custom tailored to the coil 15 which it is protecting. In any case, the principle is the same; the protective link 25 should quench in response to those conditions which will cause quench in the HTS coil 15 but should be sufficiently more sensitive so that it will fully quench before the HTS coil 15 can be damaged.

In another embodiment, the protective link 25 may be employed as a quench sensor. Quench detection in superconducting coil systems is complicated by the fact that the most direct measure of coil quench initiation can be seen by measuring the coil voltage drop due to the wire characteristics alone. Although theoretically quite straightforward, in practice this is a difficult measurement to make, both due to the fact that this voltage is typically extremely small and also due to the large inductive voltage drops which may appear across the coil 15 under typical operating conditions.

For much the same reasons that apply to its application as a fuse, a segment of superconducting wire connected in series with the superconducting coil 15, but configured so that it is more quench sensitive, can serve as a quench detection sensor. Since there is no requirement to wind the protective link 25 in the form of a coil, the inductive component of the voltage drop can be made relatively much smaller than for the coil 15. Similarly, although the overall voltage drop may be smaller due to the small size of the sensing segment, the increased quench sensitivity will result in a significant quench-produced signal across this segment before the quench causes any damage to the HTS coil 15. Hence, the protective link 25 can develop a detectable quench signal that can be used to initiate a quench-protection sequence before the quench proceeds to the point that the protective link 25 opens or the superconducting coil 15 is damaged.

Although described as separate embodiments, the fuse and sensing functions can be combined into a single dual-purpose device.

There are various parameters of the protective link 25 that may be manipulated to provide the protective link 25 with higher quench sensitivity than the superconducting coil 15. The parameters include, but are not limited to, material (i.e. type of superconducting wire), cross-sectional area of the wire, degree of cooling provided in the cooling enclosure 30, magnetic-field environment, etc.

In a first embodiment, the quench sensitivity of the protective link 25 relative to that of the superconducting coil 15 may be affected by the material of construction of the protective link 25. Both the superconducting coil 15 and the protective link 25 may be constructed of superconducting material, but the material of the protective link 25 may have a voltage/temperature characteristic such that it responds more strongly to an increase in temperature or magnetic field than does the superconducting coil 15. Many superconducting materials and their associated performance characteristics and application techniques are known to those of ordinary skill in the art, such that the materials of the superconducting coil 15 and the protective link 25 may be selected to meet this characteristic.

Figure 2:
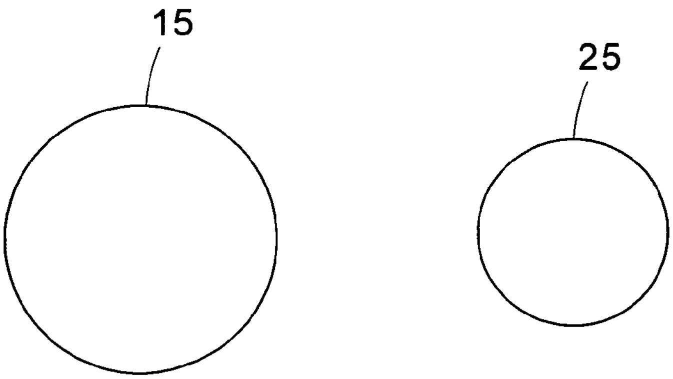
FIG. 2 is a cross-section diagram of wires used to construct the superconducting coil and the protective link in the system of FIG. 1.

Referring to FIG. 2, cross-sectional views of the superconducting wires used for the superconducting coil 15 and the protective link 25 are provided. In a second embodiment, the quench sensitivity of the protective link 25 relative to that of the superconducting coil 15 is affected by the physical construction of the protective link 25. As seen in FIG. 2, the cross-sectional area of the superconducting wire used for the protective link 25 is less than that of the superconducting coil 15. Hence, for a given current that passes through both the superconducting coil 15 and the protective link 25, the current density present in the protective link 25 is greater than the current density seen by the superconducting coil 15. Superconducting wire with a higher current density tends to quench sooner than wire with a lower current density, so the quench sensitivity of the protective link 25 shown in FIG. 2 is higher than the quench sensitivity of the superconducting coil 15. The difference between the cross-sectional areas of the wires used for the superconducting coil 15 and the protective link 25 may vary depending on the particular implementation.

Figure 3:
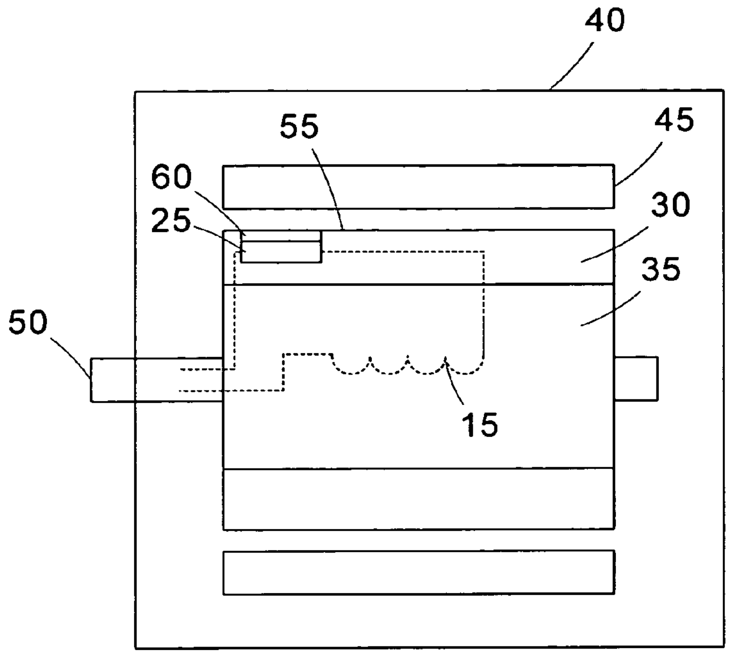
FIG. 3 is a simplified diagram of a superconducting motor system in accordance with another embodiment of the present invention.

A third technique for defining the relative quench sensitivities of the superconducting coil 15 and the protective link 25 relates to the positioning of the protective link 25 relative to that of the superconducting coil 15 within the cooling enclosure 30. The cooling enclosure 30 typically exhibits the lowest temperature in the region where the cooling medium is introduced. In the example shown in the cross-section view of FIG. 3, the superconducting coil 15 is a component of a rotor assembly 35 in a motor 40. For ease of illustration, electrical connections between the protective link 25 and the superconducting coil 15 and an excitation system are not shown. In this representation, the stator 45 of the motor 40 is not constructed of superconducting material and is not disposed within the rotating cryogenic environment. The rotor assembly 35 includes a shaft 50 through which coolant may be introduced into the cooling enclosure 30. The flow of coolant in the rotor assembly 35 can be affected such that superconducting rotor assembly 35 is cooled more effectively than the protective link 25, which will may cause the protective link 25 to operate at a higher temperature than the coil and hence to exhibit greater quench sensitivity. The cooling of the protective link 25 may be made further less efficient by coupling a thermal barrier 60 between the protective link 25 and the cooling enclosure 30.

In an embodiment, where thermal conduction is employed as a component of the cooling system within the cooling enclosure 30, the relative conductivity of the thermal path provided to the protective link 25 may be reduced as compared to that provided to the superconducting coil 15.

Other factors dependent on the placement of the protective link 25 within the cooling enclosure 30 may also affect quench sensitivity, and may be varied to increase the quench sensitivity of the protective link 25 relative to that of the superconducting coil 15. For example, the magnetic field density in the proximity of the superconducting wire also affects its propensity to quench. Based on theoretical or empirical data, the region of highest magnetic field density within the cooling enclosure 30 may be determined, and the protective link 25 may be located in the identified region.

Figure 4:
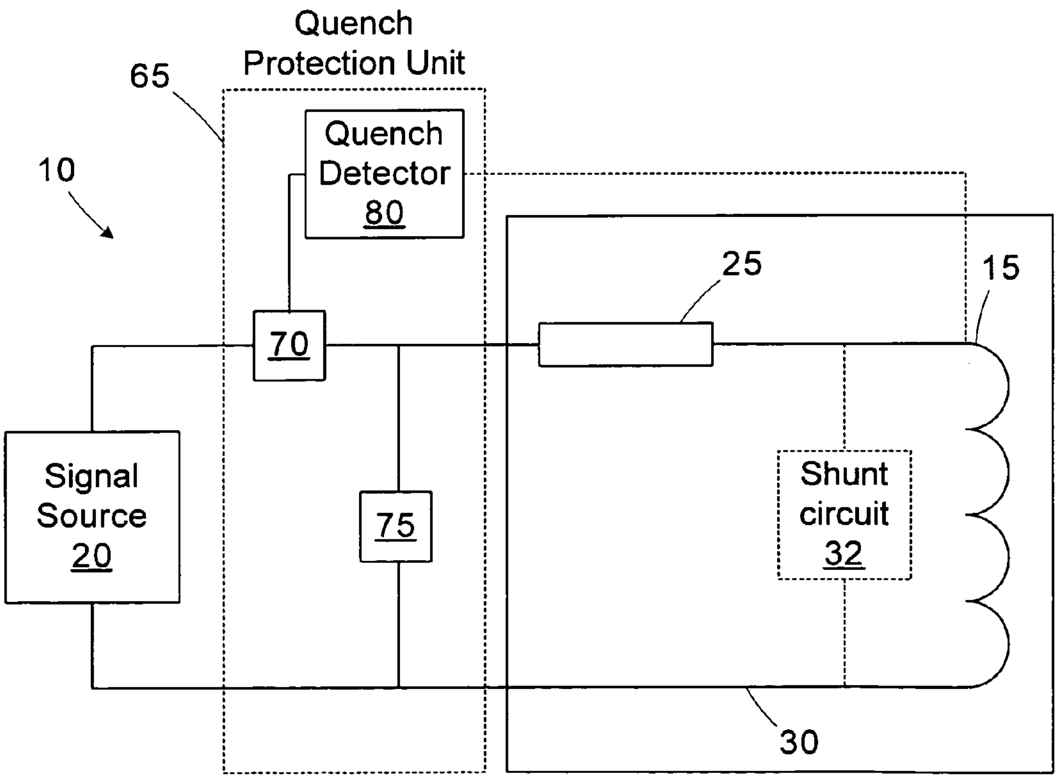
FIG. 4 is a simplified block diagram of the superconducting coil system with a first embodiment of a quench protection unit.

Turning now to FIG. 4, the superconducting coil system 10 may include other components, such as a quench protection unit 65 for dissipating energy in the event of a quench. Various quench protection schemes and circuitry for dissipating the energy in the superconducting coil 15 upon detecting a quench are known to those of ordinary skill in the art. For example, the quench protection unit 65 may include an isolation switch 70, shunt circuitry 75, and a quench detector 80. The quench detector 80 detects the onset of a quench in the superconducting coil 15 and opens the switch 70, thereby isolating the superconducting coil 15 from the signal source 20. Energy in the superconducting coil 15 is dissipated through the shunt circuitry 75. In the embodiment of FIG. 4, the protective link 25 serves as a backup protection device in the event the quench protection unit 65 fails to detect or mitigate the quench. For example, if the quench detector 80 fails to identify the quench, or the isolation switch 70 fails to open, the protective link 25 will quench and open prior to the quench causing damage to the superconducting coil 15. The shunt circuit 32 associated with the protective link 25 may dissipate the energy in the superconducting coil 15 should the protective link 25 open.

Figure 5:
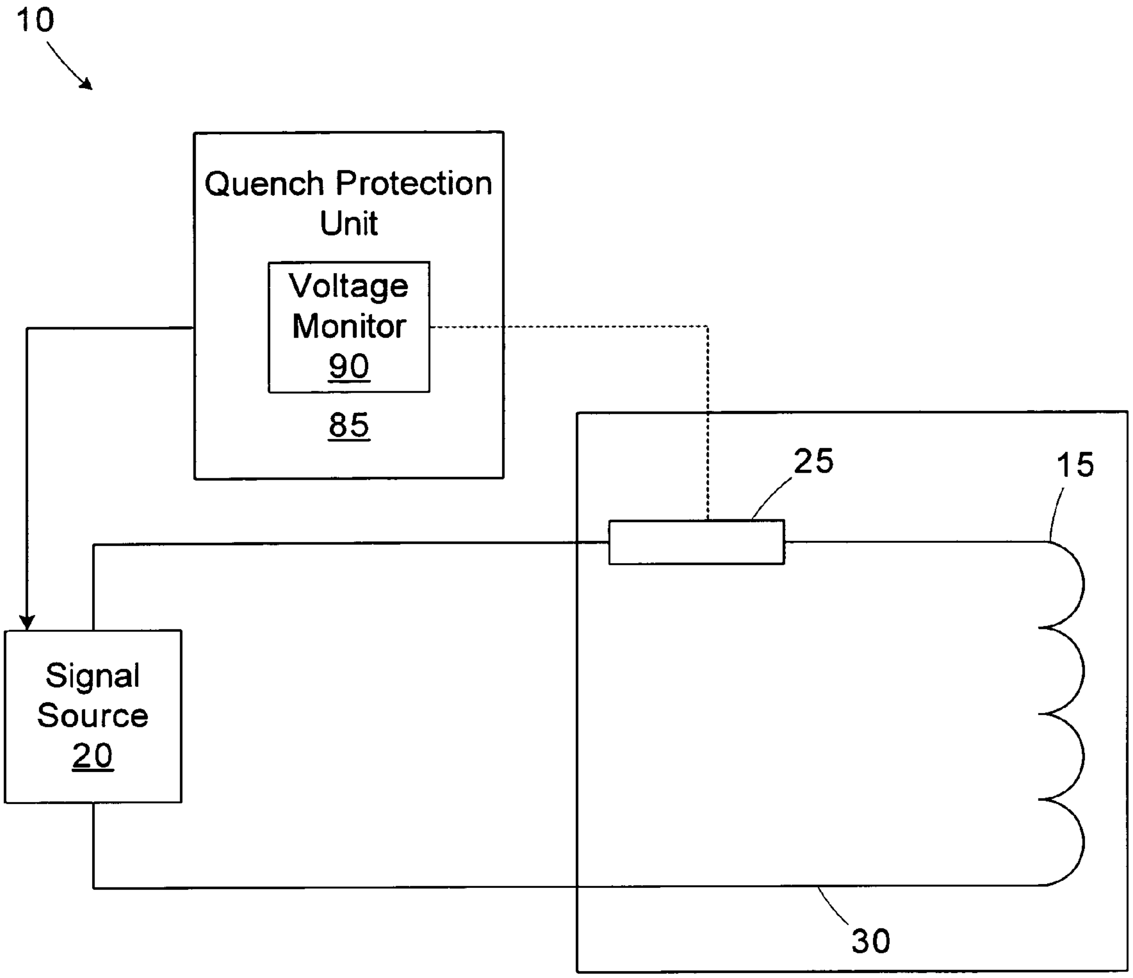
FIG. 5 is a simplified block diagram of the superconducting coil system with a second embodiment of a quench protection unit.

Referring now to FIG. 5, in another embodiment, the protective link 25 functions as a quench detector for a quench protection unit 85. As a quench condition starts, the voltage drop across a superconducting material increases. If left unchecked, this voltage drop may increase dramatically and lead to a failure of the material. The quench protection unit 85 includes a voltage monitor 90 operable to measure the voltage drop across the protective link 25. Under normal superconducting operation conditions, this voltage drop is effectively zero. However, as the protective link 25 begins to quench, this voltage drop increases. The voltage monitor 90 may compare the voltage drop across the protective link 25 to a predetermined threshold and signal a quench condition if the voltage drop exceeds the threshold. The actions taken by the quench protection unit 85 may vary.

In some applications, quenches are not catastrophic, but rather just decrease the service life of the superconducting coil 15. In such applications, it may not be necessary to interrupt the power to the superconducting coil 15. Hence, in one embodiment, the quench protection unit 85 does not interrupt power to the superconducting coil 15, but rather sends a signal to the signal source 20 to reduce the current provided to the superconducting coil 15. The signal source 20 may operate in a regeneration mode that returns energy stored in the superconducting coil 15 to its power supply bus or shunts the stored energy. Reducing the current in the superconducting coil 15 may prevent the superconducting coil 15 from quenching. The quench protection unit 85 may not include shunt circuitry, and the shunt circuit 32 shown in FIG. 1 associated with the protective link 25 may be omitted.

In another embodiment, generally arrived at by combining the embodiments of FIGS. 4 and 5, the quench protection unit 85 may include an isolation switch and/or shunting circuitry. The voltage monitor 90 may detect a pending quench based on the voltage across the protective link 25 and open the isolation switch. The quench protection unit 85 may include its own shunting circuitry or rely on the shunt circuit 32 associated with the protective link 25 to dissipate the current in the superconducting coil 15.

The protective link 25 of the present invention has numerous advantages. Because the protective link 25 exhibits a higher quench sensitivity than the superconducting coil 15, due to its material, construction, placement, cooling efficiency, or combination thereof, it will tend to quench sooner than the superconducting coil 15. This tendency allows the protective link 25 to serve as a quench detection device as well as a protection device. The protective link 25 may be used to protect the superconducting coil 15 directly or to enhance the protection provided by a separate quench protection unit 65, 85. The protective link 25 thus functions to prevent a quench in the superconducting coil 15 or to mitigate the consequences of a quench should it occur.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A superconducting coil system, comprising:

a superconducting coil; and a protective link of superconducting material coupled to the superconducting coil;

wherein the protective link is connected in series with the superconducting coil and carries current of the superconducting coil during normal operation of the superconducting coil system.

2. The system of claim 1, further comprising a power source generating the current for the superconducting coil system wherein the protective link is coupled between the power source and the superconducting coil.

3. The system of claim 1, wherein the superconducting coil has a first quench sensitivity, and the protective link has a second quench sensitivity greater than the first quench sensitivity.

4. The system of claim 3, wherein the difference between the first and second quench sensitivities is affected by at least one of a material of the superconducting coil versus a material of the protective link, a cross sectional area of wire used for the superconducting coil versus a cross sectional area of wire used for the protective link, a placement of the superconducting coil relative to the protective link, a cooling efficiency associated with the superconducting coil versus a cooling efficiency associated with the protective link, and a magnetic field density associated with the superconducting coil versus a magnetic field density associated with the protective link.

5. The system of claim 1, wherein the superconducting coil comprises a first superconducting material, and the protective link comprises a second superconducting material different from the first superconducting material.

6. The system of claim 1, wherein the superconducting coil comprises superconducting wire having a first cross sectional area, and the protective link comprises superconducting wire having a second cross sectional area less than the first cross sectional area.

7. The system of claim 1, wherein the superconducting coil is configured to carry current having a first current density, and the protective link is configured to carry current having a second current density greater than the first current density.

8. The system of claim 1, further comprising a cooling system operable to cool the superconducting coil with a first cooling efficiency and the protective link with a second cooling efficiency less than the first cooling efficiency.

9. The system of claim 1, further comprising a cooling enclosure having a casing and a thermal conductor coupled between the protective link and the casing.

10. The system of claim 3, wherein the relationship between the first and second quench sensitivities is based on a placement of the protective link relative to the superconducting coil.

11. The system of claim 10, wherein the placement of the protective link is in a region of higher temperature than the superconducting coil.

12. The system of claim 10, wherein the placement of the protective link is in a region of higher magnetic field density than the superconducting coil.

13. The system of claim 1, further comprising shunt circuitry coupled across the superconducting coil.

14. The system of claim 13, wherein the shunt circuitry is coupled between the protective link and the superconducting coil.

15. The system of claim 14, wherein the protective link is configured to operate as a protective fuse for the superconducting coil.

16. The system of claim 2, further comprising a quench protection unit operable to measure a voltage drop across the protective link and signal a quench detection responsive to the voltage drop exceeding a predetermined threshold.

17. The system of claim 16, wherein the quench protection unit is operable to send the quench detection signal to the power source, and the power source is operable to reduce the current in the superconducting coil responsive to receiving the quench detection signal.

18. The system of claim 16, wherein the quench protection unit comprises an isolation switch coupled between the power source and the superconducting coil, and the quench protection unit is operable to open the isolation switch responsive to receiving the quench detection signal.

19. The system of claim 18, further comprising shunt circuitry coupled across the superconducting coil.

20. The system of claim 1, wherein the superconducting coil comprises at least one of a medical imaging coil, a magnet coil, a motor coil, and a generator coil.

21. An apparatus, comprising:

a stator;

a superconducting rotor with superconducting coils operable to rotate within the Stator;

a power source operable to provide current to the superconducting rotor; and a protective link of superconducting material coupled between the power source and the superconducting rotor;

wherein the protective link is connected in series with the superconducting rotor and carries the current of the superconducting rotor during normal operating conditions of the apparatus.

22. The apparatus of claim 21, wherein the superconducting rotor has a first quench sensitivity, and the protective link has a second quench sensitivity greater than the first quench sensitivity.

23. The apparatus of claim 22, wherein the difference between the first and second quench sensitivities is affected by at least one of a material of the superconducting rotor versus a material of the protective link, a cross sectional area of the superconducting rotor versus a cross sectional area of the protective link, a placement of the superconducting rotor relative to the protective link, a cooling efficiency associated with the superconducting rotor versus a cooling efficiency associated with the protective link, and a magnetic field density associated with the superconducting rotor versus a magnetic field density associated with the protective link.

24. A rotating machine, comprising:

a first coil;

a second coil operable to rotate with respect to the first coil, one of the first and second coils comprising a superconducting coil; and a protective link of superconducting material coupled to the superconducting coil;

wherein the protective link is connected in series with the superconducting coil and carries current of the superconducting coil during normal operating conditions of the rotating machine.

25. The rotating machine of claim 24, wherein the superconducting coil has a first quench sensitivity, and the protective link has a second quench sensitivity greater than the first quench sensitivity.

26. A rotating machine, comprising:

a first coil;

a second coil operable to rotate with respect to the first coil, one of the first and second coils comprising a superconducting coil; and a protective link of superconducting material coupled in series with the superconducting coil, the protective link carrying current to the superconducting coil during normal operation, the protective link being configured to solely sense a quench condition in the superconducting coil and interrupt the current supplied to the superconducting coil.

27. A rotating machine, comprising:

a first coil;

a second coil operable to rotate with respect to the first coil, one of the first and second coils comprising a superconducting coil;

a protective link of superconducting material coupled in series with the superconducting coil, and a quench protection unit operable to measure a voltage drop across the protective link and generate a quench detection signal responsive to the voltage drop exceeding a predetermined threshold.

28. The rotating machine of claim 27, wherein the quench protection unit is operable to send a quench detection signal to a power source coupled to the superconducting coil, and the power source is operable to reduce a current in the superconducting coil responsive to receiving the quench detection signal.

29. A superconducting coil system, comprising:

a superconducting coil; and a protective link of superconducting material coupled to the superconducting coil;

wherein the protective link is connected in series with the superconducting coil and carries current of the superconducting coil during normal operation of the superconducting coil system; and further comprising shunt circuitry coupled across the superconducting coil;

wherein the shunt circuitry is coupled between the protective link and the superconducting coil; and wherein the protective link is configured to detect a quench condition and then to directly interrupt current to the superconducting coil.

* * * * *